(12) United States Patent
Chuang

(10) Patent No.: US 6,967,831 B2
(45) Date of Patent: Nov. 22, 2005

(54) FOLDABLE KEYBOARD

(75) Inventor: Tsung Jen Chuang, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 4 days.

(21) Appl. No.: 10/373,758

(22) Filed: Feb. 27, 2003

(65) Prior Publication Data

US 2003/0128502 A1    Jul. 10, 2003

Related U.S. Application Data

(63) Continuation-in-part of application No. 09/991,688, filed on Nov. 26, 2001, now abandoned.

(51) Int. Cl.$^7$ ................................................ G06F 1/16
(52) U.S. Cl. ..................................................... 361/680
(58) Field of Search ........................................ 361/680

(56) References Cited

U.S. PATENT DOCUMENTS 6,163,268 A * 12/2000 Obata et al. ............. 340/693.5
6,239,390 B1 * 5/2001 Fukui et al. ................. 200/5 A
6,327,142 B1 * 12/2001 Cronk .......................... 361/683
6,390,699 B1 * 5/2002 Lam ............................. 400/472
6,476,733 B1 * 11/2002 Amiri ........................... 341/20
6,636,419 B2 * 10/2003 Duarte ......................... 361/680
6,734,809 B1 * 5/2004 Olodort et al. ............... 341/22
2002/0093436 A1 * 7/2002 Lein

* cited by examiner

Primary Examiner—Yean-Hsi Chang

(74) Attorney, Agent, or Firm—Rosenberg, Klein & Lee

(57) ABSTRACT

A foldable keyboard comprises a keyboard body, a circuit, and a plurality of flexible printed circuit. The keyboard body has a plurality of touch panels in serial connection. Each touch panel has a pair of conductive membranes being segmented into a plurality of blocks for generating a panel signal. The adjacent touch panels are connected by the flexible printed circuits so that the touch panels can be folded in a stacked way. The touch panels are segmented into a plurality of blocks. A plurality of legends is formed on the top surface or the bottom surface of the keyboard body. The legends respectively correspond to the blocks.

17 Claims, 11 Drawing Sheets

FOLDABLE KEYBOARD

CROSS-REFERENCE TO RELATED APPLICATIONS

This application is a Continuation-in-Part of application Ser. No. 09/991,688, filed on Nov. 26, 2001 now abandoned, and entitles FOLDABLE KEYBOARD.

FIELD OF THE INVENTION

The present invention relates to a foldable keyboard, especially to a foldable keyboard employing touch panel and applicable to portable electronic devices such as PDA (personal digital assistant) or cellulous phone.

BACKGROUND OF THE INVENTION

The compact and portable electronic devices such as PDA (personal digital assistant) or cellulous phone are essential for mobile communication era. The compact and portable electronic devices generally uses foldable keyboard for inputting data. The foldable keyboard should be compact for portability while the operational convenience should be preserved.

However, the conventional foldable keyboard for portable electronic devices such as PDA still has a volume larger than PDA itself after the foldable keyboard is folded. More particularly, the conventional foldable keyboard has considerable thickness after the foldable keyboard is folded. It is not convenient for user to put the folded keyboard in his pocket for carry. Moreover, the conventional foldable keyboard has complicated components; the weight and size of the conventional foldable keyboard are hard to be shrunk.

FIGS. 1 and 2 show a conventional foldable keyboard 1a, which comprises two outer panels 10a and 11a, and two inner panels 12a and 13a. The foldable keyboard 1a further comprises a plurality of keys 14a arranged on the two outer panels 10a and 11a, and the two inner panels 12a and 13a. The two inner panels 12a and 13a are pivotally connected and the backsides thereof face to each other when the two inner panels 12a and 13a are collapsed. Moreover, the two outer panels 10a and 11a are pivotally connected to the two inner panels 12a and 13a through respective hinge unit 15a. Therefore, the two outer panels 10a and 11a can be collapsed with respect to the two inner panels 12a and 13a, respectively such that the two inner panels 12a and 13a are sandwiched between the two outer panels 10a and 11a.

The above-mentioned foldable keyboard 1a is segmented to four foldable segments such that the foldable keyboard 1a has only one-fourth area after it is folded. However, the thickness is excessively large and makes the foldable keyboard 1a hard to be put in user's pocket.

Moreover, the key 14a in the above-mentioned foldable keyboard 1a may have scissor structure (not shown) to reduce the thickness of the foldable keyboard 1a after the foldable keyboard 1a is folded. However, the scissor structure is complicated and increases weight of the foldable keyboard 1a.

Alternatively, the spacing between adjacent keys can be decrease to reduce the volume of the folded keyboard. However, the volume reduction is limited and the reduced spacing may increase probability of typing error.

SUMMARY OF THE INVENTION

It is the first object of the present invention to provide a foldable keyboard employing touch panel, which has compact size and comes in handy.

It is the second object of the present invention to provide a foldable keyboard, which has area same as that of business card after folding and can be expanded to have area same as typing region of a standard keyboard.

To achieve the first object of the present invention, the present invention provides a foldable keyboard for portable electronic devices comprising a keyboard body having a plurality of business-card size touch panels, and a plurality of flexible printed circuits electrically connected two adjacent touch panels with a predetermined length in a lateral direction thereby enabling the keyboard body to fold laterally in a stacked way, in which the keyboard body has the same area as that of main typing region on a standard-sized computer keyboard when unfolding the touch panels; each touch panel having a pair of conductive membranes being segmented into a plurality of blocks, in which the touch panels generates a panel signal when the pair of conductive membranes are pressed into contact, and each block corresponds to a panel signal; and a plurality of legends formed on the touch panels, wherein the legends respectively corresponds to the blocks and are arranged as the standard keyboard.

To achieve the second object of the present invention, the present invention provides a foldable keyboard comprising a keyboard body composed of five business-card size touch panels in which the keyboard body has the same area as that of main typing region on a standard-sized computer keyboard when unfolding the touch panels.

BRIEF DESCRIPTION OF THE DRAWINGS

The various objects and advantages of the present invention will be more readily understood from the following detailed description when read in conjunction with the appended drawing, in which.

DETAILED DESCRIPTION OF THE INVENTION

Figure 1:
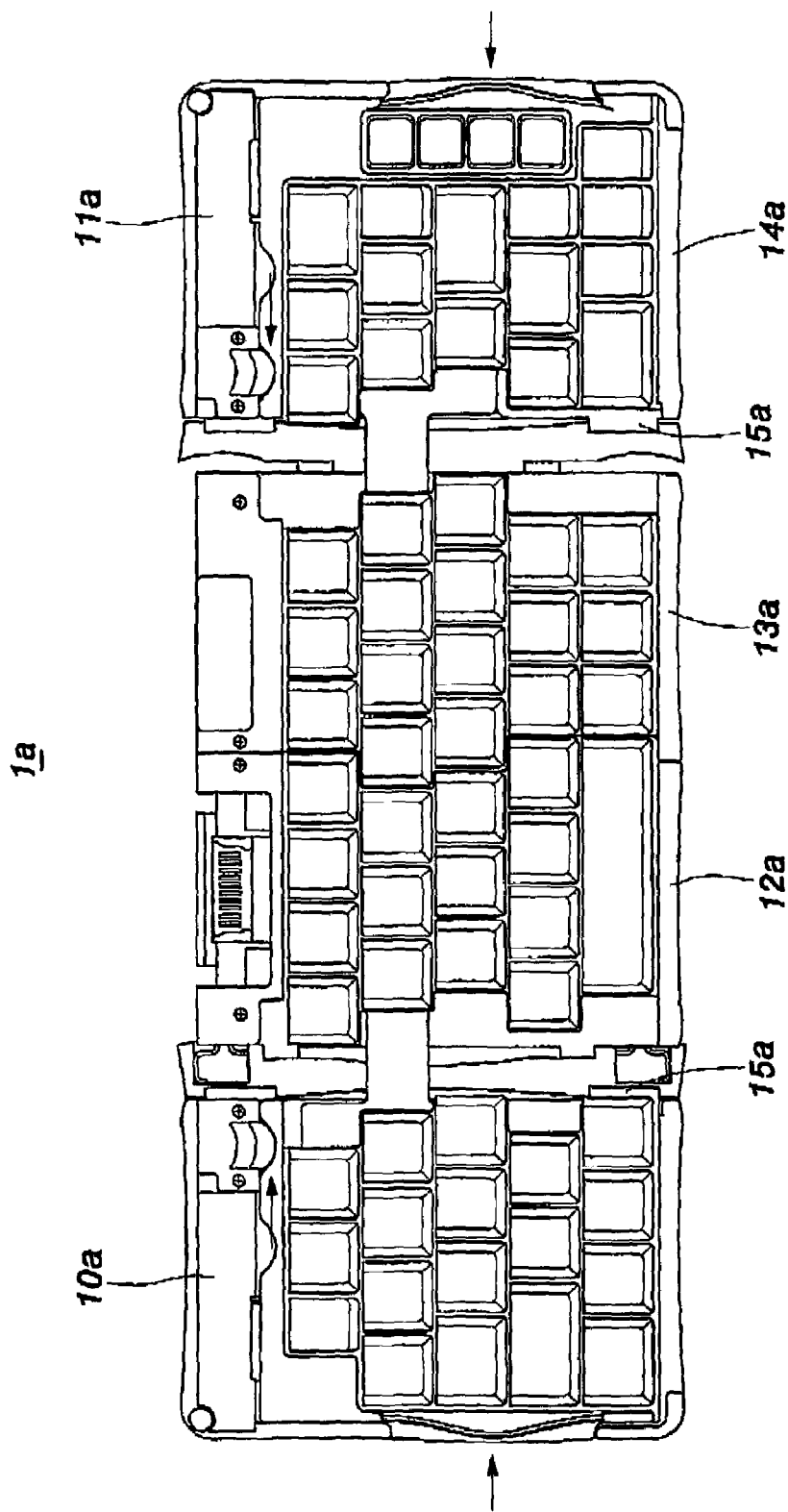
FIG. 1 shows a conventional foldable keyboard in expanding state.
Figure 2:
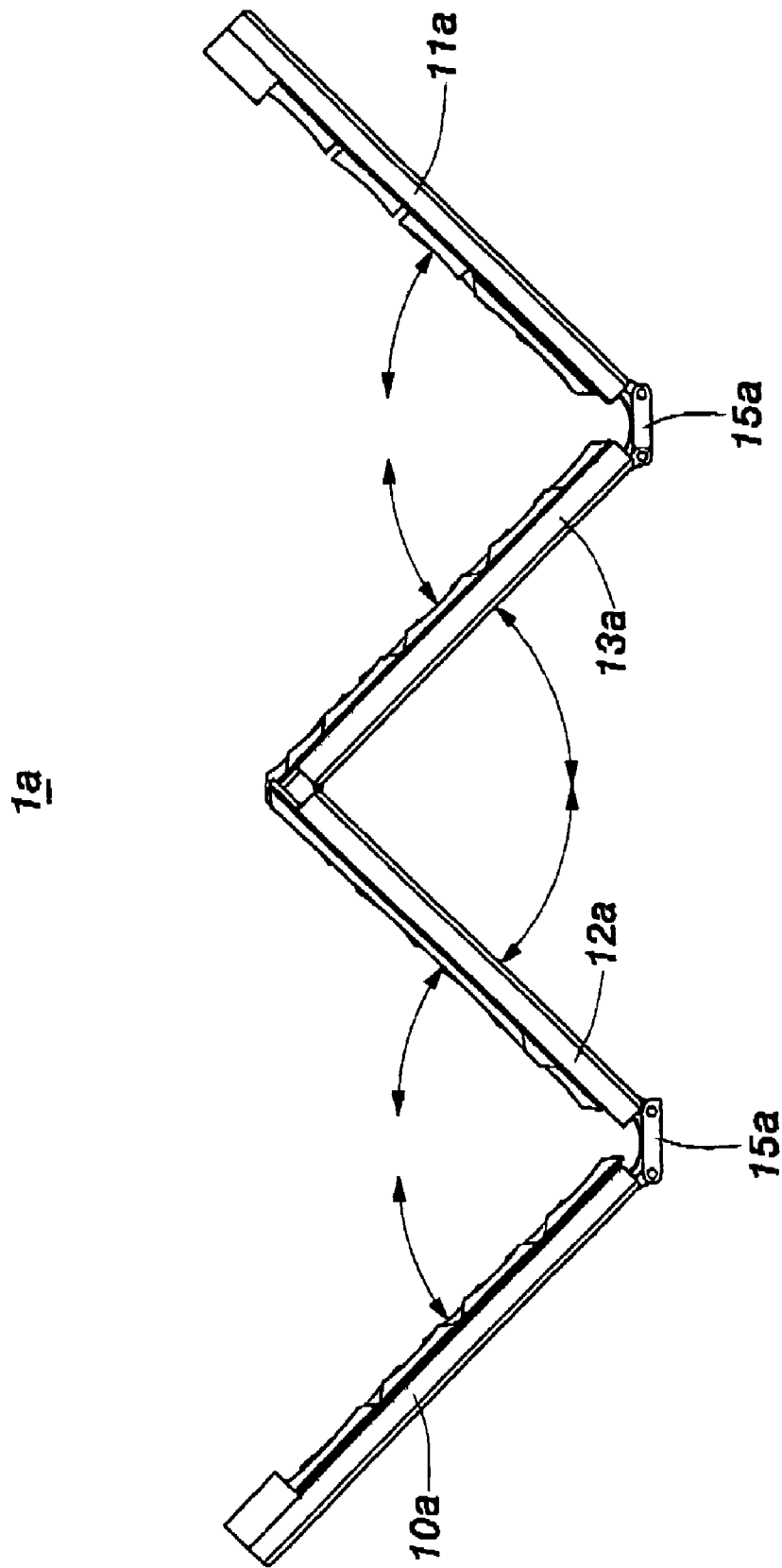
FIG. 2 shows a conventional foldable keyboard in folding state.
Figure 3:
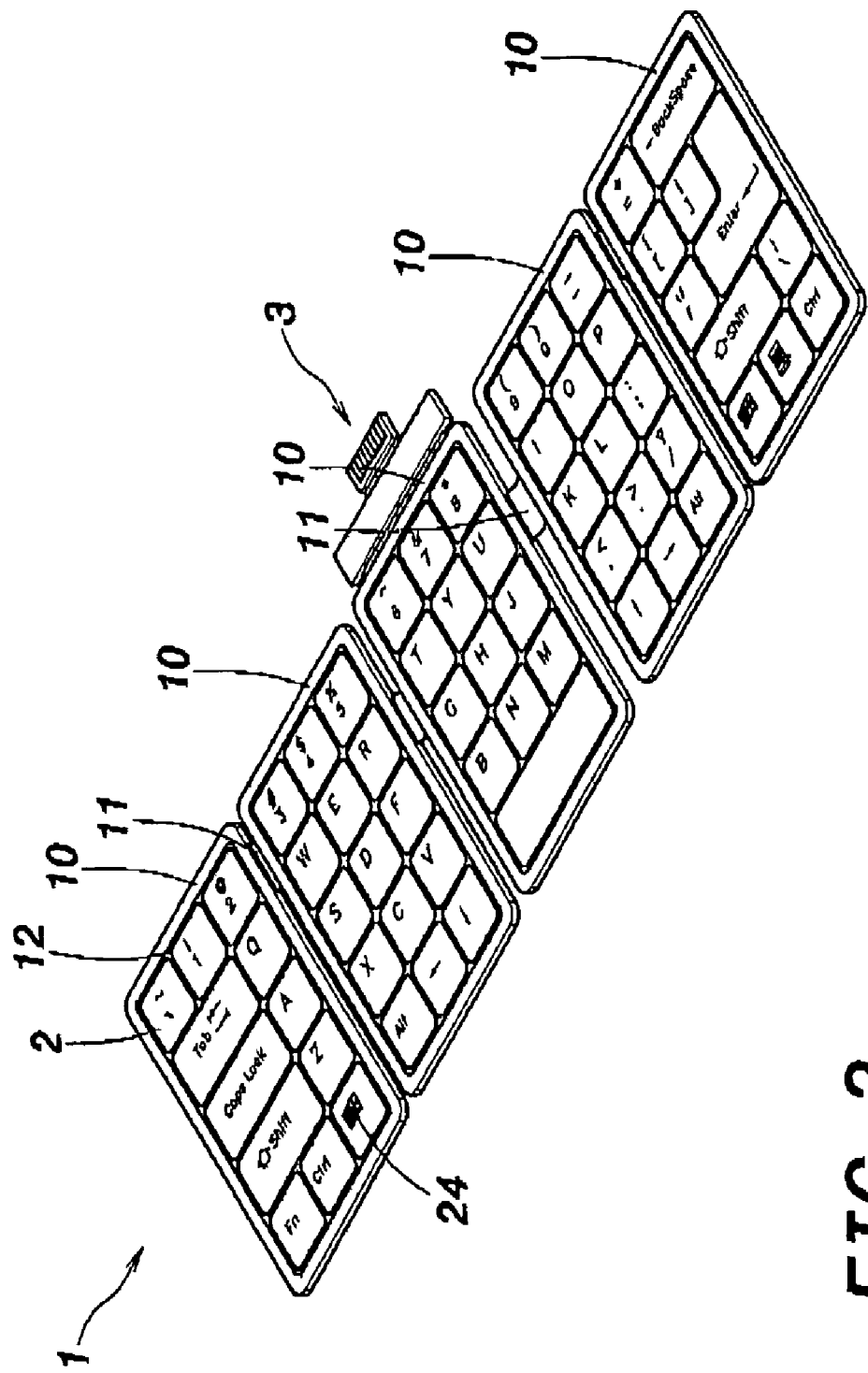
FIG. 3 shows the foldable keyboard of the present invention in expanding state.
Figure 4:
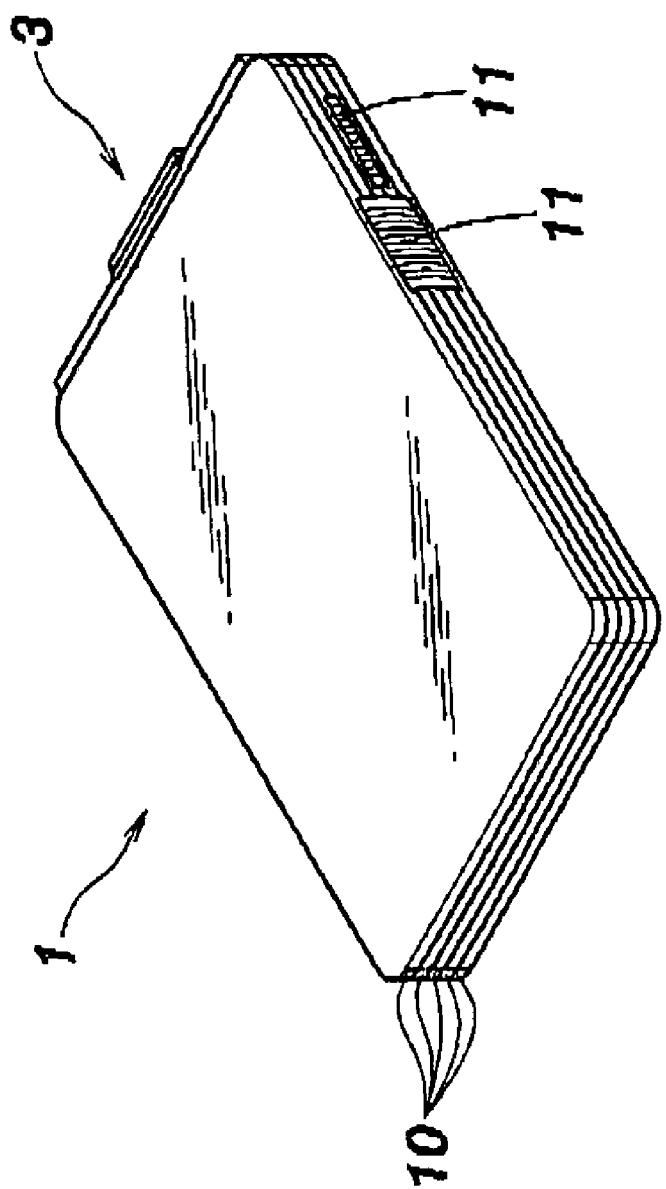
FIG. 4 shows the foldable keyboard of the present invention in folding state.

FIGS. 3 and 4 show the foldable keyboard of the present invention in expanding state and folding state, respectively. The present invention is intended to provide a foldable keyboard employing touch panel to enhance the portability and reduce assembling complexity thereof. The foldable keyboard of the present invention mainly comprises a keyboard body 1, a plurality of keys 2 and a circuit 3.

The keyboard body 1 comprises at least two touch panels 10 arranged along a lateral direction and electrically connected by a plurality of FPC 11 (flexible printed circuits). The touch panels 10 can be operated to stack on each other due to the flexibility of the FPC 11. Therefore, the keyboard body 1 can be folded and expanded along the FPC 11.

Figure 9:
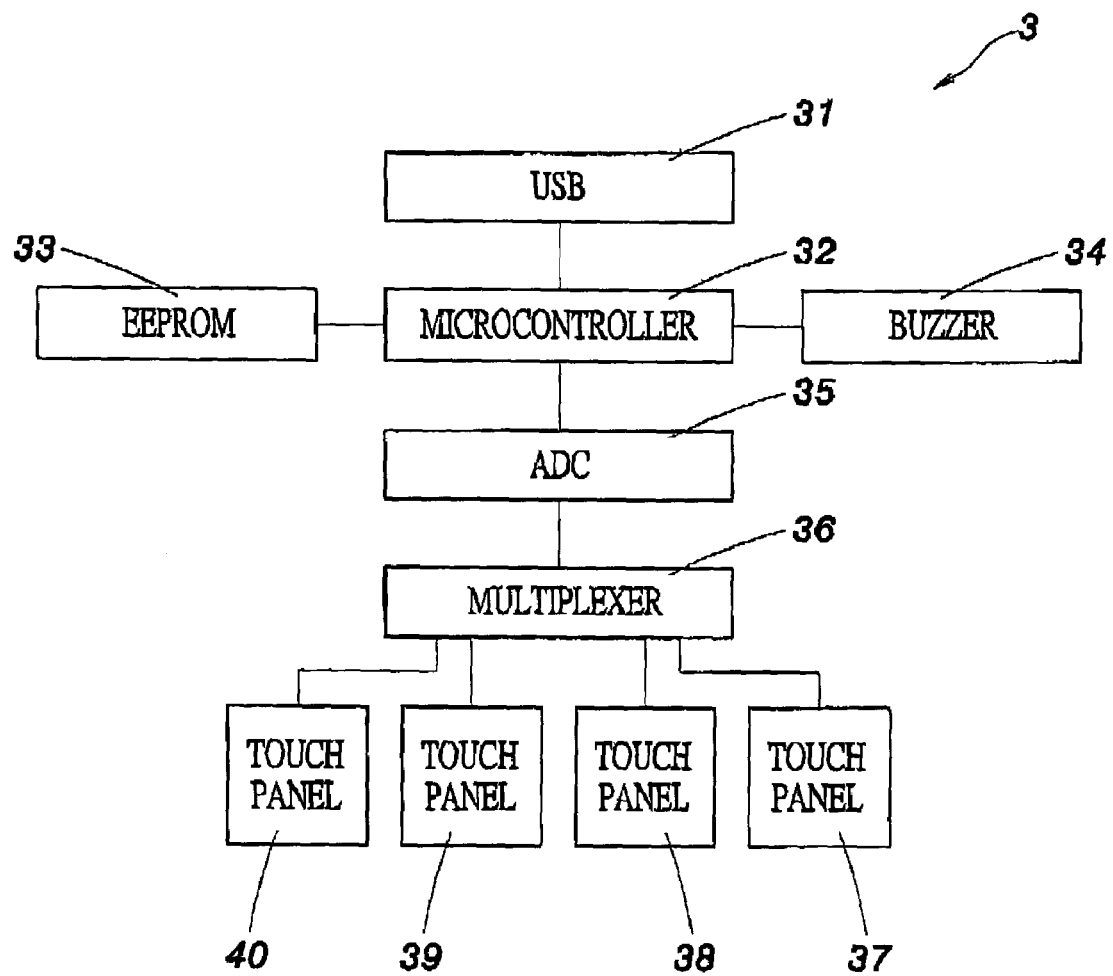
FIG. 9 shows a block diagram of a circuit of the foldable keyboard of the present invention.

Each of the touch panels 10 is segmented into a plurality of blocks 12 in similar manner to the segmentation of keys in standard keyboard. Therefore, the keys 2 of the keyboard can be realized on those blocks 12. Moreover, a plurality of legends 24 is formed on top surface or bottom surface of the keyboard body 1. For example, the legends 24 may be formed by printing to facilitate typing operation for user. Alternatively, an auxiliary sounding unit 34 (as shown in FIG. 9) is provided in the circuit of the foldable keyboard and generates sound corresponding to typing of certain key 2 to facilitate typing operation for user.

With reference now to FIGS. 3 and 4, a preferred embodiment of the present invention is demonstrated. The standard keyboard generally has a main typing region with area roughly equal to the area of five business cards (the area of main typing region in a standard keyboard is 275 mm×90 mm, and the area of a business card is 55 mm×90 mm). Therefore, the keyboard body 1 is composed of five touch panels 10 in this preferred embodiment, and each of the five touch panels 10 has an area same as that of a business card. Those touch panels 10 can be folded to have an area as that of a business card and the user can conveniently place the folded touch panels 10 in his pocket.

Figure 5:
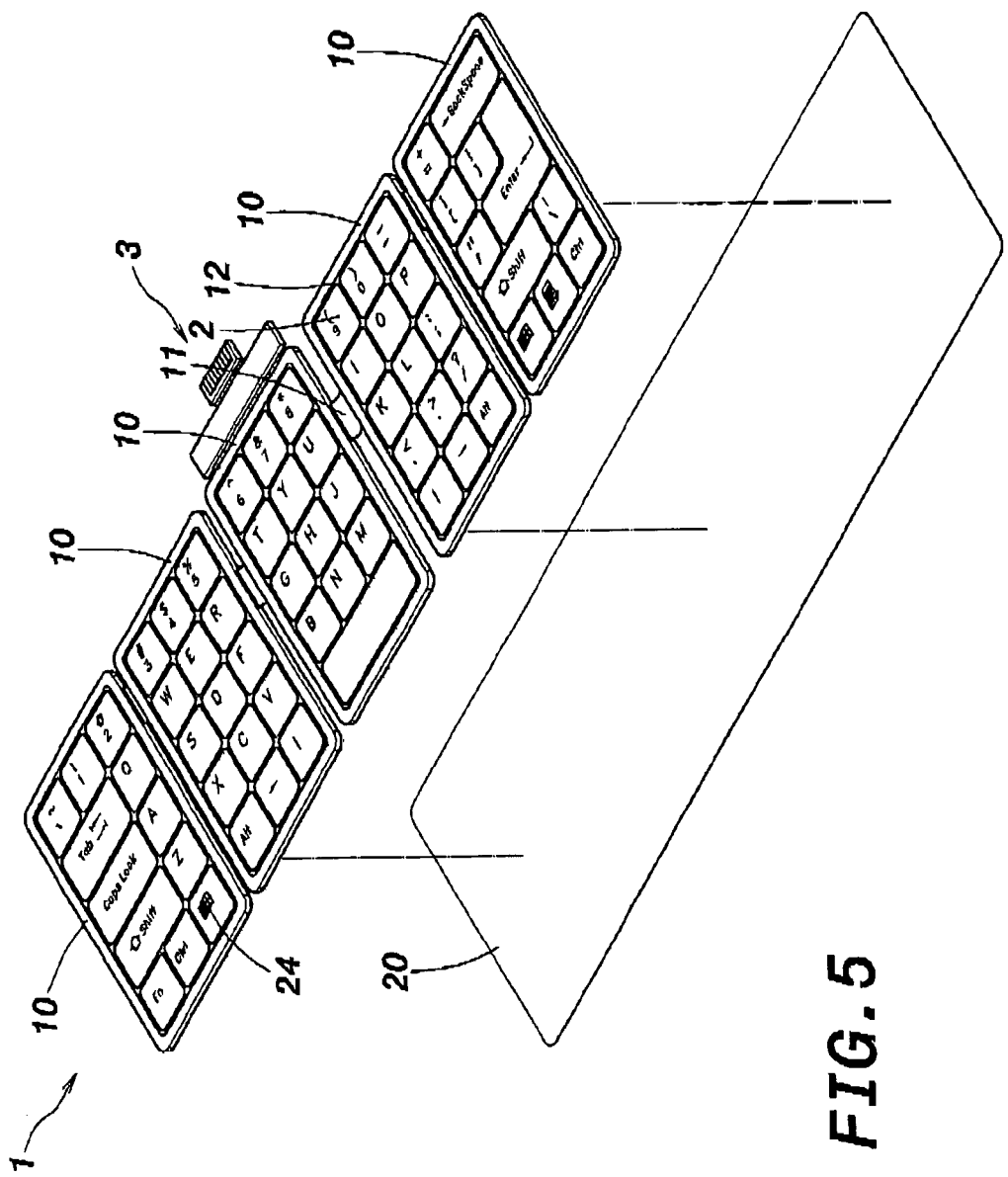
FIG. 5 shows the foldable keyboard of a preferred embodiment of the present invention in expanding state.

Moreover, as shown in FIG. 5, a protective layer 20 is provided for the keyboard body 1. The protective layer 20 can be formed by synthetic leather or by fuzz and has a size equal to that of the keyboard body 1 to cover the bottom of the keyboard body 1. The protective layer 20 provides protection function for the keyboard body 1 when the keyboard body 1 is placed on desktop or other surface. The protective layer 20 also has decorating effect for the keyboard body 1 and does not result much weight increment.

Figure 6:
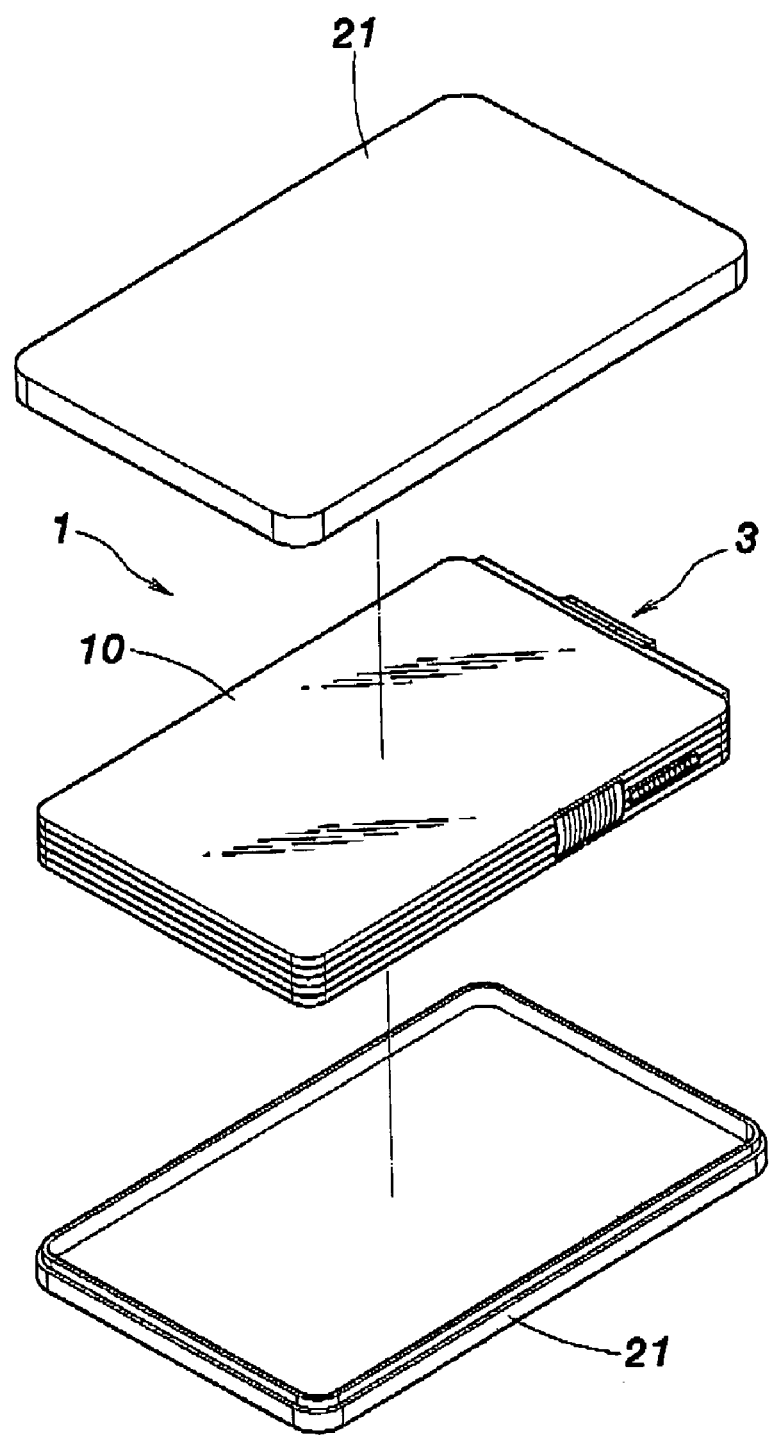
FIG. 6 shows the foldable keyboard of a preferred embodiment of the present invention in folding state.

With reference now to FIG. 6, two outer cases 21 are provided on two outmost touch panels 10, respectively, when the foldable keyboard is folded. Therefore, the outer cases 21 can cover two outmost touch panels 10 of the foldable keyboard when the foldable keyboard is folded. The outer cases 21 can be made of Al—Mg alloy to provide protection function.

Figure 7:
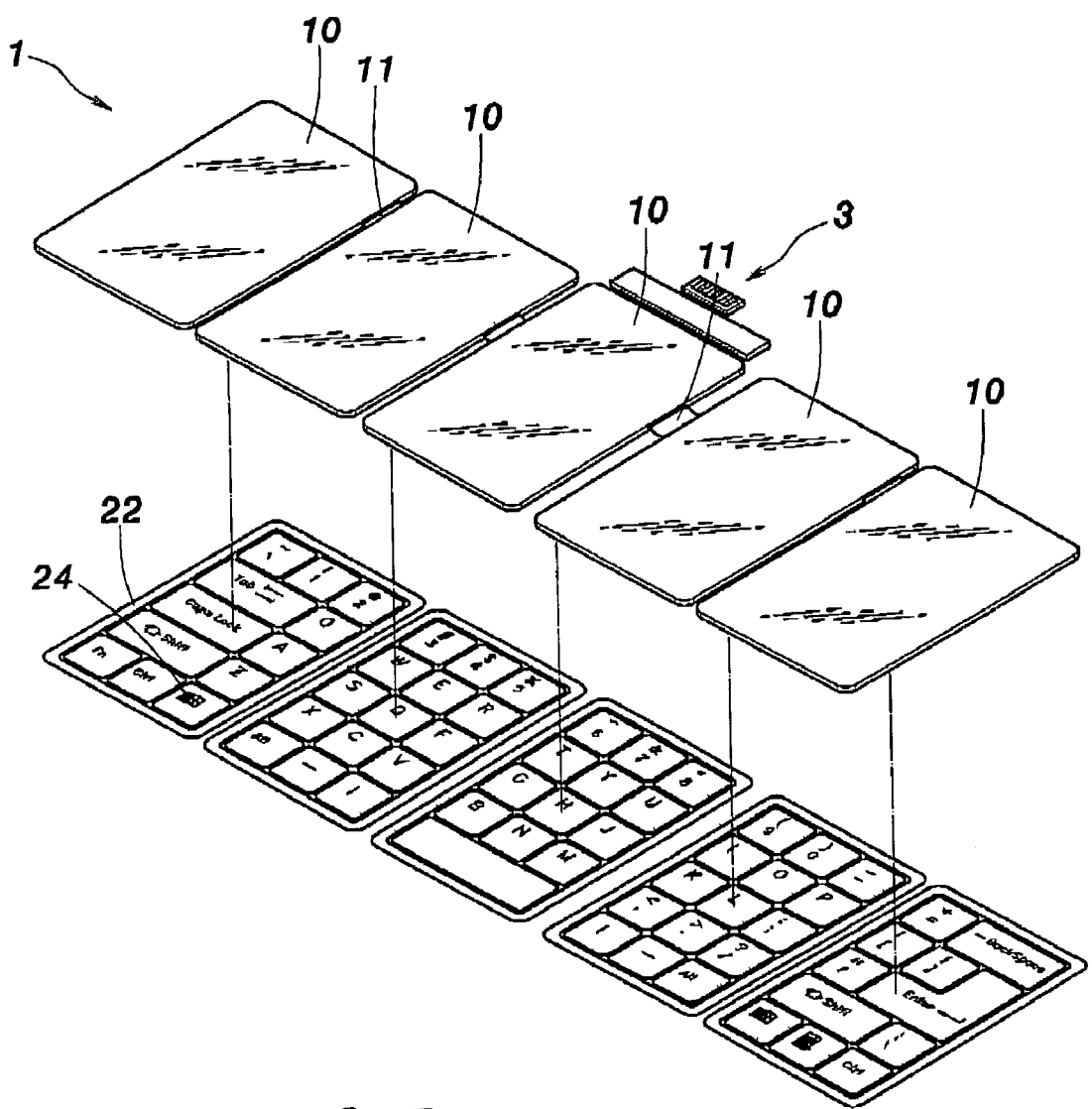
FIG. 7 shows the foldable keyboard of another preferred embodiment of the present invention in expanding state.
Figure 8:
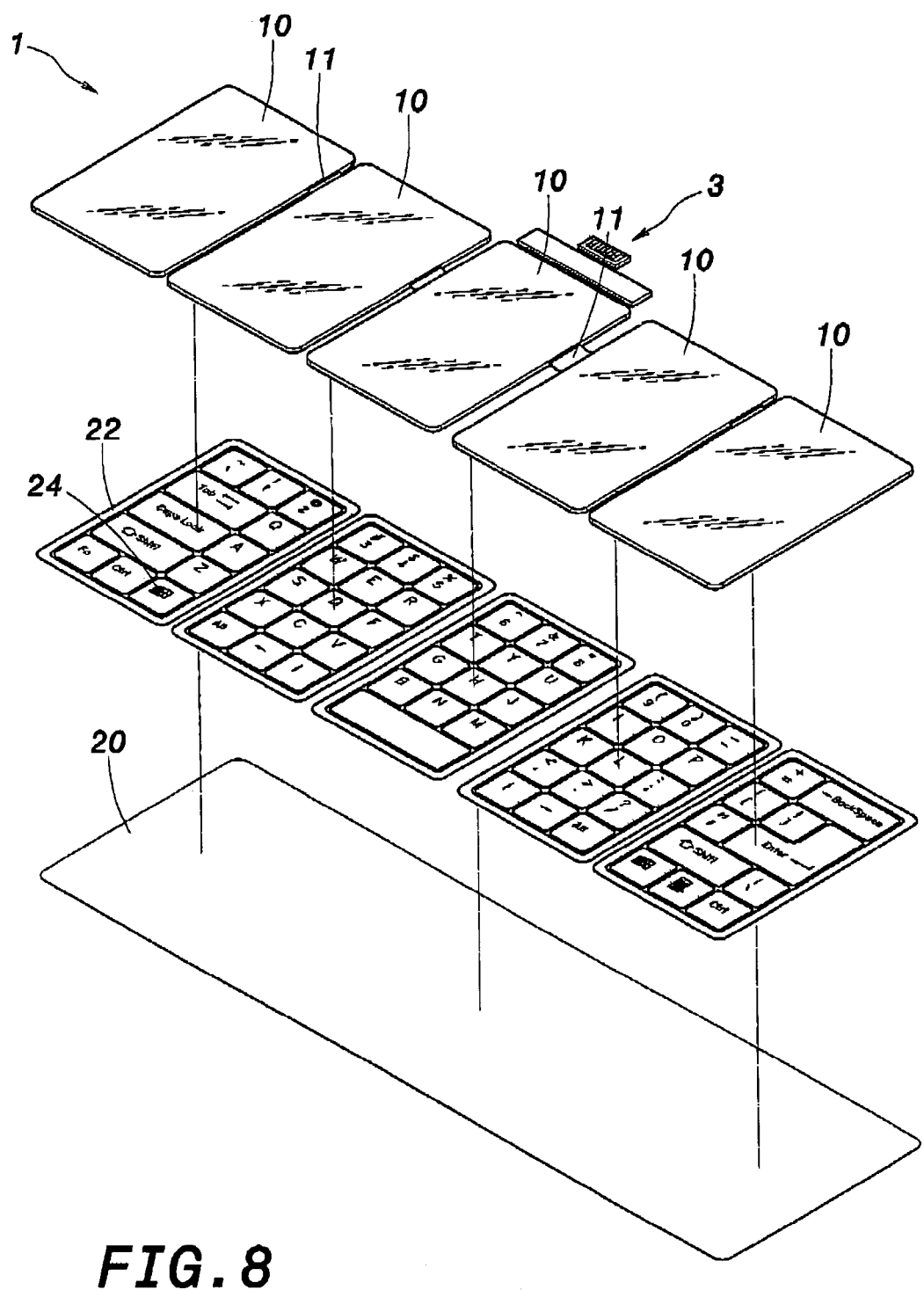
FIG. 8 shows the foldable keyboard of another preferred embodiment of the present invention in folding state.

Moreover, with reference to FIGS. 7 and 8, the legends 24 for the keys 2 of the foldable keyboard can be formed on a plurality of laminas 22, the number thereof depends on the number of the touch panels 10. The laminas 22 are arranged on top or bottom sides of corresponding touch panels 10 and can also be made of Al—Mg alloy. Moreover, the bottom surface of the laminas 22 can also be protected by protective layer 20.

FIG. 9 shows a block diagram of a circuit of the foldable keyboard of the present invention. The circuit 3 comprises an USB (universal-serial-bus) controller 31 which is an interface controller for interfacing a digital signal with the portable electrical product, a micro-controller 32 which is electrically coupled to the USB controller 31, a memory 33 which is electrically coupled to the micro-controller 32, such as, an EEPROM (electrically erasable programmable read-only memory), a sounding unit, buzzer 34 which is electrically connected to the micro-controller 32 for sending a warning signal when improper operating, an ADC (analog-to-digital converter) 35 which electrically coupled to the micro-controller 32, and a multiplexer 36 which is electrically coupled to the analog-to-digital converter 35 and four touch panels 37, 38, 39, 40. The species of micro-controller 32 can be, but not limit to, CY16003. The EEPROM 33 can be, but not limit to, A0784. The multiplexer 36 can be, but not limit to, CD4066.

Figure 10:
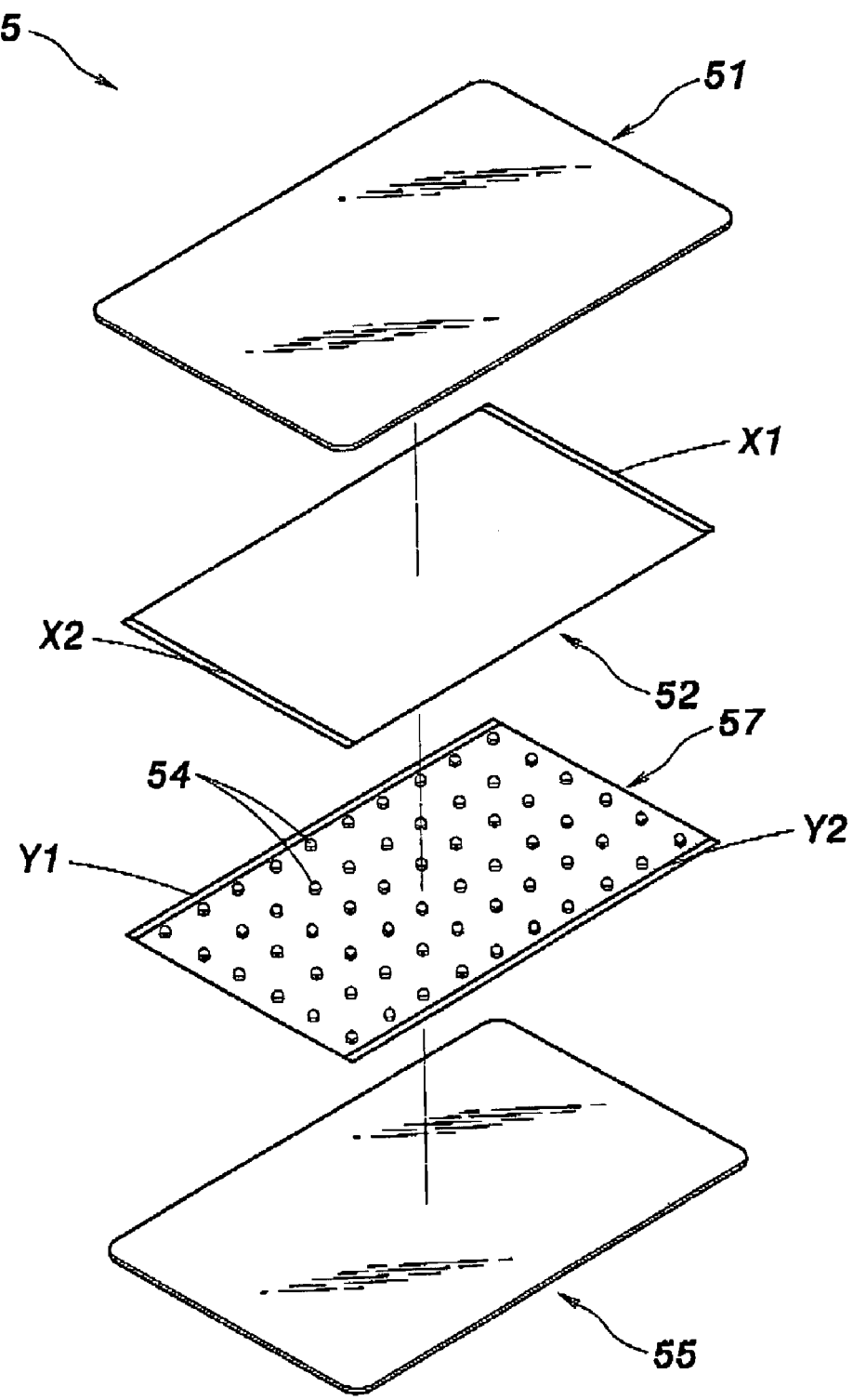
FIG. 10 shows a perspective view of a resistive type touch panel of the present invention.
Figure 11:
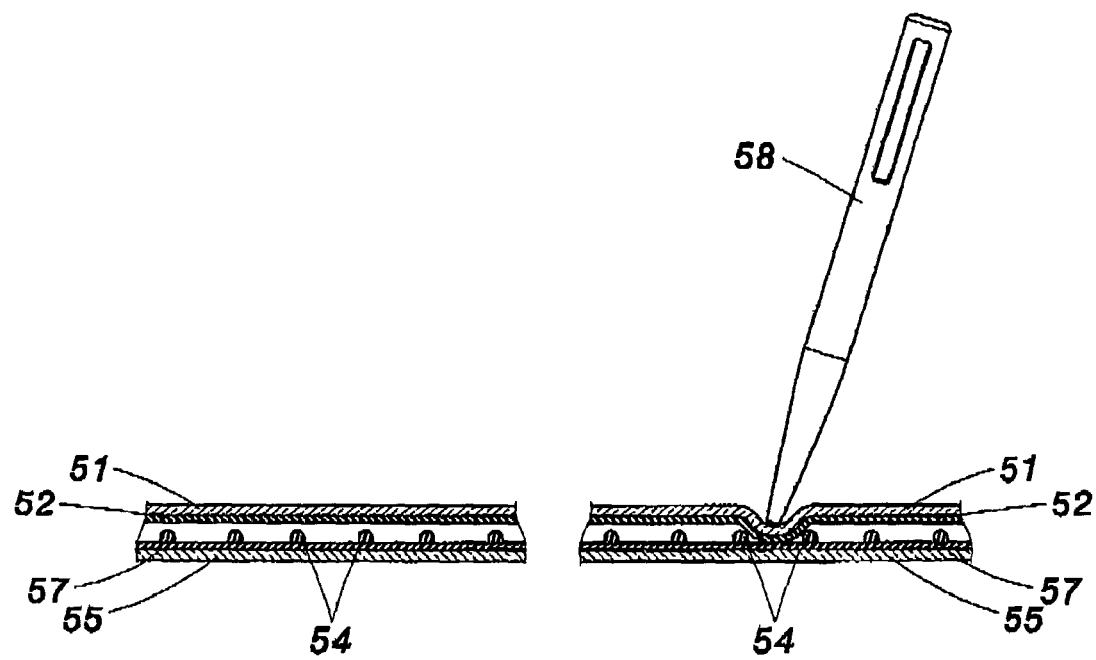
FIG. 11 shows a cross-section view of a resistive type touch panel of the present invention.

FIG. 10 shows a perspective view of a resistive type touch panel of the present invention and FIG. 11 shows a cross-section view of a resistive type touch panel of the present invention. The resistive type touch panel 5 comprises a film 51, a first ITO membrane (indium-tin oxide membrane) 52 being a transparent conductive membrane, a pair of parallel electrodes (X1, X2) 53 disposed on the fringes of the first ITO membrane 52, a second ITO membrane 57 being a transparent conductive membrane, a plurality of spacer 54 affixed on the second ITO membrane 57 for suspending the first ITO membrane 52, a pair of parallel electrodes (Y1, Y2) disposed on the fringes of the second ITO membrane 57, and a glass or film 55 as a substantially rigid base plate for supporting the second ITO membrane 57.

When a pen 58 presses down, the upper and lower layers of film come into contact generating a signal that identifies the coordinate of the touch relative to the screen image. Each of touch panels having the first and second conductive membranes 52, 57 is for generating respectively a panel signal. The multiplexer 36 multiplexes the panel signal into a multiplexing signal, and the analog-to-digital converter 35 converts the multiplexing signal into a digital signal. The micro-controller 32 is for controlling and processing the digital signal and the memory 33 is for storing the digital signal. The USB controller 31, an interface controller, is for interfacing the digital signal with the portable electrical product.

Touch panels are becoming an increasingly common feature on portable products. Because they are integrated directly onto the screen, touch panels make products lighter and smaller giving them added portability and convenience.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. A foldable keyboard for portable electronic devices comprising:
    a keyboard body having a plurality of separate touch panels, each touch panel being substantially flat with a top surface and a bottom surface and flexibly hinged to at least one adjacent touch panel and further comprising:
    a rigid base plate;
    a lower conductive membrane fixedly disposed on said rigid base plate;
    a plurality of protrusive spacers fixedly disposed as an array on said lower conductive membrane;

an upper conductive membrane fixedly disposed on said plurality of spacers so that said plurality of spacers are interposed between said upper and lower conductive membranes and define a plurality of blocks so that a panel signal is generated when said upper conductive membrane contacts said lower conductive membrane as when so caused by a user exerting a sufficient pressure on said upper conductive membrane;

a film disposed on said upper conductive membrane;

a plurality of legends formed on said film wherein each of said plurality of legends corresponds respectively to each of said plurality of blocks and are arranged as a standard keyboard;

a plurality of printed circuits respectively electrically and structurally linking in a flexible hinged manner pairs of adjacent touch panels in a lateral direction thereby enabling the plurality of touch panels to be folded laterally one on the other to a stacked folded condition and electrically connecting said conductive membranes of said touch panels; and, a circuit member for reversibly docking and electrically connecting said keyboard to a portable electronic device;

wherein said keyboard body has the same area as that of a main typing region on a standard-sized computer keyboard when said touch panels are unfolded to an unstacked unfolded condition;

wherein the keyboard body in said stacked folded condition is adapted for insertion into a pocket of said user.

2. The foldable keyboard as claimed in claim 1, wherein each of said plurality of touch panels is business-card size.

3. The foldable keyboard as claimed in claim 1, further comprising a pair of outer cases that together form a container having a cavity for receiving the foldable keyboard in a stacked folded condition therein, each of the outer cases having a flat inner surface.

4. The foldable keyboard as claimed in claim 3, wherein the outer cases are made of an Al—Mg alloy.

5. The foldable keyboard as claimed in claim 1, further comprising a protective layer with a shape corresponding to that of the keyboard body and fixedly covering a bottom of the keyboard body.

6. The foldable keyboard as claimed in claim 5, wherein the protective layer is made of a synthetic leather.

7. The foldable keyboard as claimed in claim 1, further comprising a plurality of laminas respectively disposed on said top surface or said bottom surface of the touch panels.

8. The foldable keyboard as claimed in claim 7, wherein each of the plurality of laminas is made of a material chosen from the group consisting of an Al—Mg alloy and an indium-tin oxide composition.

9. The foldable keyboard as claimed in claim 7, further comprising a protective layer with shape corresponding to that of the keyboard body and covering bottom surfaces of the laminas.

10. The foldable keyboard as claimed in claim 9, wherein the protective layer is made of a synthetic leather.

11. The foldable keyboard as recited in claim 1, wherein each of said touch panels has a width substantially equal to 55 mm and a length substantially equal to 90 mm and said keyboard in said unstacked unfolded condition has a width substantially equal to 90 mm and a length substantially equal to 275 mm.

12. A foldable keyboard for portable electronic devices comprising:

a keyboard body having a plurality of separate touch panels, each of said touch panels including an upper conductive membrane overlaying a lower conductive member in spaced relationship and an array of a plurality of protrusive spacers disposed between the upper and lower conductive membranes and affixed on said lower conductive membrane; and, a plurality of printed circuits respectively electrically and structurally connecting pairs of adjacent touch panels in a lateral direction thereby enabling the keyboard body to be folded laterally to a stacked folded condition and adapted for insertion of the foldable keyboard into a pocket for portable use, wherein the keyboard body in an unstacked unfolded condition has the same area as that of a main typing region on a standard-sized computer keyboard;

each touch panel having a pair of conductive membranes being segmented into a plurality of blocks, in which a panel signal is generated when the pair of conductive membranes are pressed into contact, and each block corresponds to a panel signal;

a plurality of laminas respectively disposed on a bottom of the touch panels, each lamina having a plurality of legends formed thereon, wherein the legends correspond to the respective blocks and are arranged as a standard keyboard; and, a circuit member adapted for docking and electrically connecting at least one of the touch panels to a portable electronic device.

13. The foldable keyboard as claimed in claim 12, wherein the circuit member comprises:

a multiplexer unit being electrically connected to one of the touch panels for multiplexing the panel signal into a multiplexing signal;

an analog-to-digital converter member being electrically connected to the multiplexer for converting the multiplexing signal into a digital signal;

a micro-controller unit being electrically connected to the analog-to-digital converter for controlling and processing the digital signal;

a memory unit being electrically connected to the micro-controller unit for storing the digital signal; and an interface controller member electrically connected to the micro-controller unit for transmitting the digital signal of the foldable keyboard to said portable electronic device.

14. The foldable keyboard as claimed in claim 12, wherein each of the touch panels has a length and a width substantially the same as a business card.

15. The foldable keyboard as claimed in claim 13, further comprising a buzzer for emitting a warning signal sound.

16. The foldable keyboard as claimed in claim 13, wherein the memory unit consists essentially of an electrically erasable programmable read-only memory, EEPROM.

17. The foldable keyboard as recited in claim 12, wherein each of said touch panels has a width substantially equal to 55 mm and a length substantially equal to 90 mm and said keyboard in said unstacked unfolded condition has a width substantially equal to 90 mm and a length substantially equal to 275 mm.

* * * * *